United States Patent
Johnson et al.

(10) Patent No.: US 12,345,198 B1
(45) Date of Patent: Jul. 1, 2025

(54) THERMAL IMPACT OF GAS STORAGE

(71) Applicant: Schlumberger Technology Corporation, Sugar Land, TX (US)

(72) Inventors: Ashley Bernard Johnson, Milton (GB); Jonathan Robert Hird, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/767,604

(22) Filed: Jul. 9, 2024

(51) Int. Cl.
*F02C 6/16* (2006.01)
*F02C 6/18* (2006.01)

(52) U.S. Cl.
CPC . *F02C 6/16* (2013.01); *F02C 6/18* (2013.01)

(58) Field of Classification Search
CPC ..................................... F02C 6/14; F02C 6/16
See application file for complete search history.

(56) References Cited

U.S. PATENT DOCUMENTS

| | | | | |
|---|---|---|---|---|
| 4,150,547 | A * | 4/1979 | Hobson | F02C 6/16 60/659 |
| 4,441,028 | A * | 4/1984 | Lundberg | F02C 6/16 60/39.182 |
| 5,634,340 | A * | 6/1997 | Grennan | F02C 6/16 60/648 |
| 5,934,063 | A * | 8/1999 | Nakhamkin | F02C 6/16 60/773 |
| 11,644,150 | B2 | 5/2023 | Stradiotto | |
| 12,222,068 | B2 * | 2/2025 | Stradiotto | F28D 20/0052 |
| 2020/0263830 | A1 * | 8/2020 | Stradiotto | B65G 5/00 |
| 2022/0090585 | A1 * | 3/2022 | Lewis | H01L 21/76895 |
| 2022/0196341 | A1 * | 6/2022 | Young | B65G 5/00 |
| 2024/0218885 | A1 * | 7/2024 | Young | F02C 6/16 |

OTHER PUBLICATIONS

Rogers et al., "Engineering Thermodynamics, Work and Mass Transfer", Longman, 1980, Chapter 12, 28 pages.

* cited by examiner

*Primary Examiner* — William H Rodriguez (57) ABSTRACT

Systems and methods are provided that store and release compressed gas, which include an accumulator for storing compressed gas, a gas compressor, a thermal storage subsystem, a plurality of secondary heater stages and a corresponding plurality of gas expander stages, and a secondary heat source. During accumulation operations, the thermal storage subsystem is configured to extract heat from the compressed gas produced by the gas compressor and supplied to the accumulator and store the extracted heat. During the expansion operations, the secondary heater stages and gas expander stages are configured to heat and expand compressed gas supplied from the accumulator and heated by the thermal storage subsystem. The secondary heater stages use heat supplied by the secondary heat source. The secondary heat source can extract heat from a green or renewable system or an industrial process located at or near the system that stores and releases compressed gas.

20 Claims, 5 Drawing Sheets

THERMAL IMPACT OF GAS STORAGE

FIELD

The present disclosure relates to systems and methods that store and release compressed gas.

BACKGROUND

Electricity storage is highly sought after, particularly in view of the cost disparities incurred when consuming electrical energy from a power grid during peak usage periods as compared to low usage periods. The addition of renewable energy sources that generate electricity in a discontinuous or intermittent manner increases the demand for affordable electrical energy storage worldwide.

In principal, compressed gas storage systems are a simple solution to middle and long-term energy storage, typically comprising of a vessel, often an underground cavern, a compressor to generate the compressed gas for storage in the vessel, and a machine to generate electricity from the expansion of the compressed gas released from the vessel. Although these systems have been widely discussed, it is difficult to find quantitative measures of performance and efficiency of these systems.

A key consideration is that the process of gas compression releases significant levels of heat. This heat can be captured and stored by a thermal storage subsystem, and then used to heat the compressed gas that is released from the vessel prior to expansion. Such thermal storage is part of the compressed gas storage systems currently being developed and commercialized by Hydrostor Inc. of Toronto, Canada and described in U.S. Pat. No. 11,644,150.

Without thermal storage, the efficiency of an ideal (isentropic) gas storage system operating at 1000 psi will be 30%. Most of the losses arise from the heat generated as the gas is compressed and released during the storage period.

Thermal storage and use of the stored heat to heat the compressed gas that is released from the vessel prior to expansion can increase efficiency but an isentropic expansion system from 1000 psi would require gas temperatures as high as 700° C. Such high gas temperature are difficult to achieve, and thus limit the efficiency of the prior art compressed gas storage systems.

SUMMARY

Systems and methods are provided that store and release compressed gas, which include an accumulator for storing compressed gas, a gas compressor, a thermal storage subsystem, a plurality of secondary heater stages and a corresponding plurality of gas expander stages, and a secondary heat source. During accumulation operations, the thermal storage subsystem is configured to extract heat from the compressed gas produced by the gas compressor and supplied to the accumulator and store the heat. During the expansion operations, the secondary heater stages and gas expander stages are configured to heat and expand compressed gas supplied from the accumulator and heated by the thermal storage subsystem. The secondary heater stages use heat supplied by the secondary heat source. The secondary heat source can extract heat from a green or renewable system or an industrial process located at or near the system that stores and releases compressed gas.

In embodiments, the thermal storage subsystem can be operably disposed between the gas compressor and the accumulator, and the thermal storage subsystem can be operably disposed between the accumulator and the plurality of secondary heater stages and the corresponding plurality of gas expander stages.

In embodiments, the gas compressor can be configured to produce compressed gas for supply to the accumulator via the thermal storage subsystem during the accumulation operations.

In embodiments, the thermal storage subsystem can be operably configured to extract heat from the compressed gas produced by the gas compressor and supplied to the accumulator during the accumulation operations and store the heat for use in the expansion operations.

In embodiments, the thermal storage subsystem can be operably configured to use heat stored by the thermal storage subsystem to heat compressed gas released from the accumulator for supply to the plurality of secondary heater stages and the corresponding plurality of gas expander stages in the expansion operations.

In embodiments, the plurality of secondary heater stages and the corresponding plurality of gas expander stages can be configured to heat and expand compressed gas supplied from the accumulator and heated by the thermal storage subsystem during the expansion operations. The plurality of secondary heater stages can use heat supplied by the secondary heat source to heat the compressed gas supplied from the accumulator and heated by the thermal storage subsystem.

In embodiments, the secondary heat source can be configured to extract heat from a green or renewable system located at or near the system that stores and releases compressed gas. For example, the green or renewable system can include a photovoltaic system or a geothermal system located at or near the system that stores and releases compressed gas.

In embodiments, the secondary heat source can be configured to extract heat from an industrial process located at or near the system that stores and releases compressed gas.

In embodiments, the secondary heat source supplies hot fluid to the plurality of secondary heater stages at a temperature up to 90° C.

In embodiments, the gas compressor can be driven by a motor during the accumulation operations.

In embodiments, the plurality of gas expander stages can drive an electrical generator during the expansion operations.

In embodiments, the system can include a controller for controlling the accumulation operations and the expansion operations.

In embodiments, at least part of the accumulator can be disposed underground with a shaft extending from the surface to the accumulator.

In embodiments, at least part of the thermal storage subsystem can be disposed underground.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 6 also depicts a plot of system efficiency as a function of compressed gas storage pressure for a systems that employs expansion without secondary heating.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Figure 1:
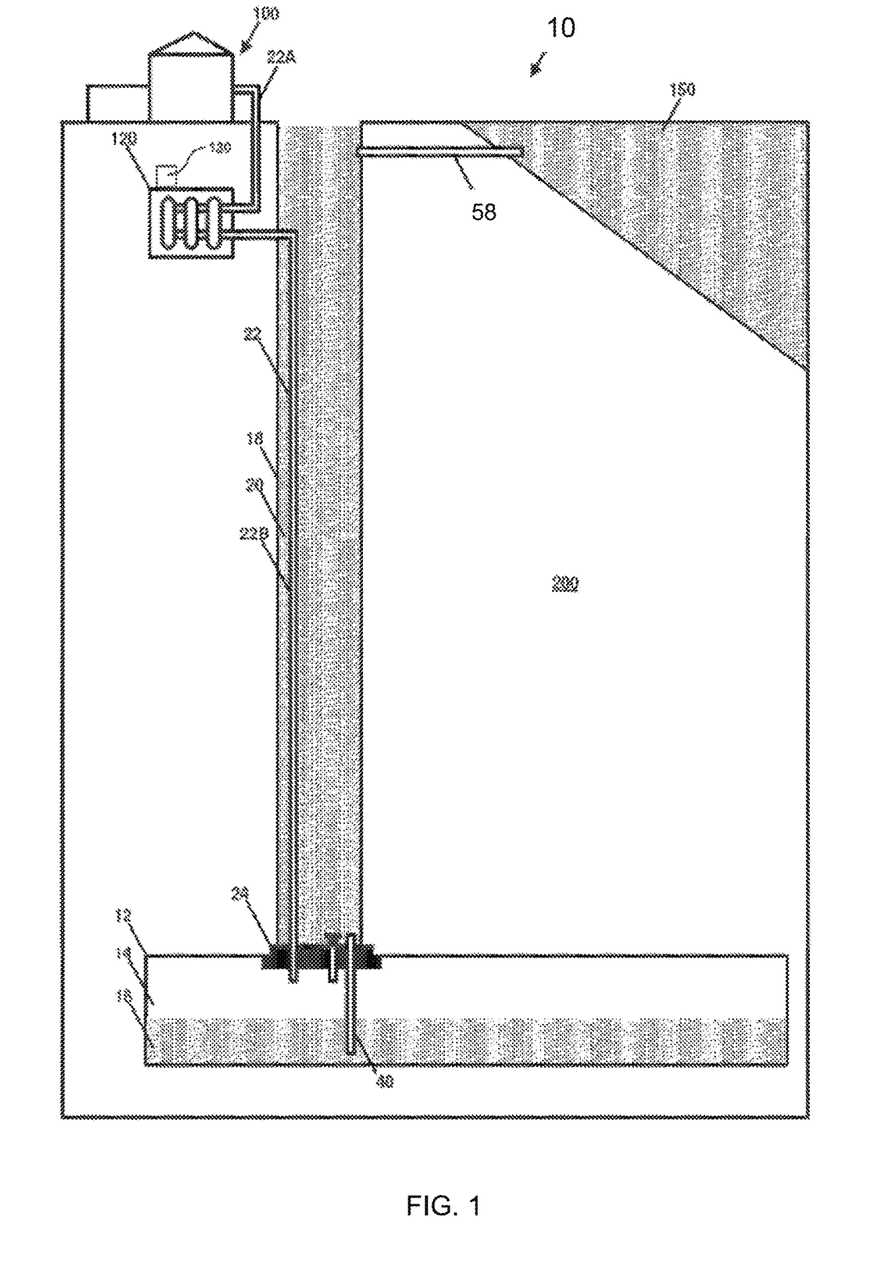
FIG. 1 is a schematic diagram of a system that stores and releases compressed gas in accordance with the present disclosure.
Figure 2:
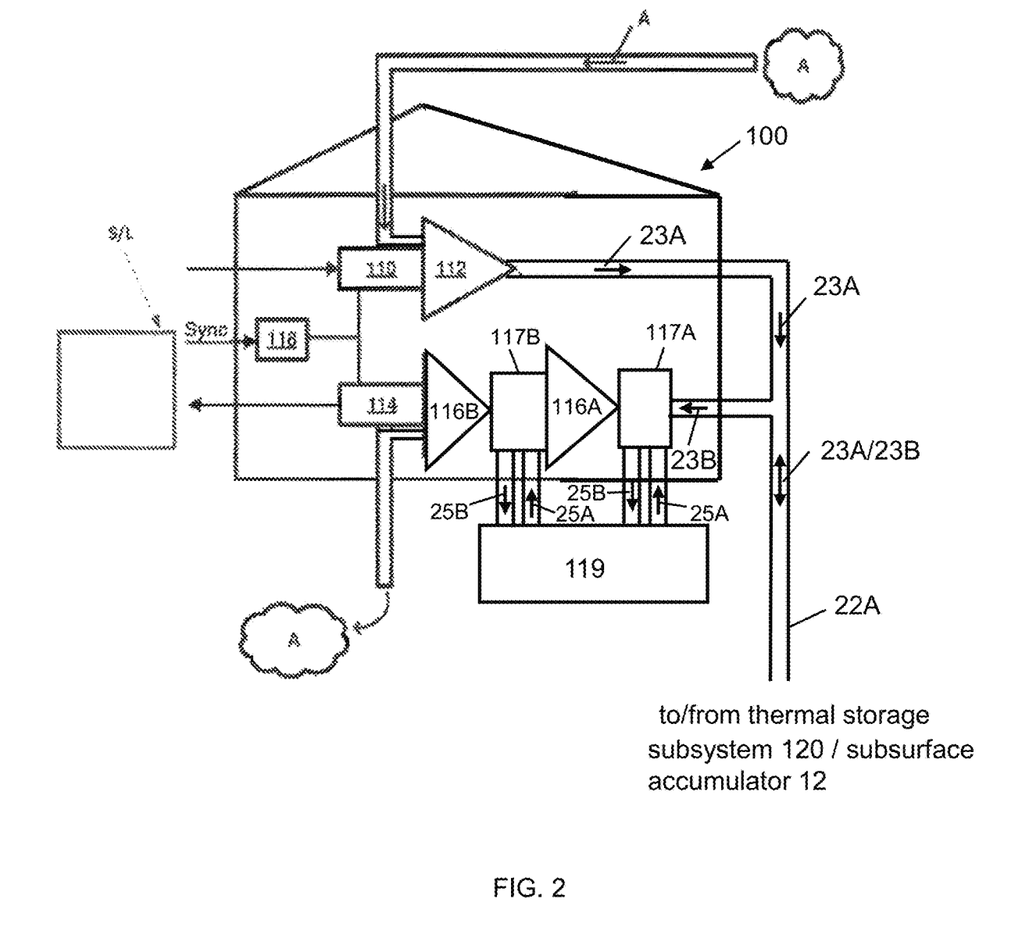
FIG. 2 is a schematic diagram of a compressor/expander subsystem that is part of the system of FIG. 1 in accordance with the present disclosure.

FIGS. 1 and 2 are schematic views of a compressed gas energy storage system 10 according to an embodiment of the present disclosure. The system 10 can be configured to compress a gas, store the compressed gas, and release the compressed gas from storage. As shown in FIG. 1, the system 10 includes an accumulator 12 that is located underground. In this example, the accumulator 12 serves as a chamber or vessel for holding both compressed gas and possibly a liquid (such as water). The accumulator 12 can include any suitable type of pressure vessel or tank, or as in this example can be an underground cave or chamber that is within ground 200.

In embodiments, the accumulator 12 can be lined, for example using concrete, metal, plastic and combinations thereof or the like, to help make it substantially gas and/or liquid impermeable so as to help to prevent unwanted egress of gas or liquid from escaping the interior of the accumulator 12. In other embodiments, the accumulator 12 can be impermeable to gas and or liquid without requiring a lining.

The accumulator 12 may have any suitable configuration. The accumulator 12 can be sized based on a variety of factors (e.g., the quantity of gas to be stored, the available space in a given location, etc.). In the embodiment of FIG. 1, the accumulator 12 contains a layer of stored compressed gas 14 atop a layer of liquid 16, such as water. The volume (and thus capacity) of the accumulator 16 can be selected based on the quantity of gas 14 to be stored, the duration of storage required for system 10, and other suitable factors which may be related to the capacity or other features of a suitable power source and/or power load with which the system 10 is to be associated. The power source/load may be, in some examples, a power grid, a power source (including renewable and optionally non-renewable sources) and the like.

The accumulator 12 may be positioned below ground or underwater, or alternatively may be at least partially above ground. Positioning the accumulator 12 within the ground 200, as shown, may allow the weight of the ground/soil to help backstop/buttress the walls of the accumulator 12, and help resist any outwardly acting forces that are exerted on the walls of the accumulator 12. The depth of the accumulator in the ground 200 can be established according to the pressures at which the compression/expansion equipment to be used is most efficiently operated.

The gas that is to be compressed and stored in the accumulator 12 may be any suitable gas, including, but not limited to, air, nitrogen, noble gases and combinations thereof and the like. Using air may be preferable in some embodiments as a desired quantity of air may be drawn into the system from the surrounding, ambient environment, and the pressurized gas/air that is released from within the accumulator 12 and subject to expansion can be vented to the ambient environment, without requiring further treatment.

The accumulator 12 may include at least one primary opening that can be sealed in a generally air/gas tight manner when the system 10 is in use. The primary opening(s) can provide access to the interior of the accumulator 12, for example, for use during construction of the accumulator and/or to permit access for inspection and/or maintenance of the accumulator 12. In the example shown, a primary opening is provided in the upper wall of the accumulator 12. In other embodiments, primary opening(s) can be provided in other parts of the accumulator 12. When the system 10 is in use, the primary opening may be sealed using a suitable bulkhead 24 as shown. The bulkhead 24 may be manufactured, in situ, or may be manufactured offsite, and may be made of any suitable material, including, concrete, metal, plastics, composites and the like. In the illustrated embodiment, the bulkhead 24 is assembled in situ at the interface between shaft 18 and accumulator 12 of multiple pieces of reinforced concrete.

In embodiments, the system 10 can include a shaft 18 extending through the ground 200 from the surface to the accumulator 12. In the embodiment shown in FIG. 1, the shaft 18 extends along a generally vertical shaft axis, but may have other configurations, such as curved trajectory or other more complex paths. The upper end of the shaft 18 may be open to the atmosphere as shown, or may be capped, enclosed or otherwise sealed. In the embodiment shown, shaft 18 is generally cylindrical with a diameter between about 2 m and about 15 m or more. In such arrangements, the interior of the shaft 18 may be able to accommodate about 1,000-150,000 cubic meters of water.

In the arrangement shown in FIG. 1, the bulkhead 24 is positioned at the interface between the shaft 18 and the accumulator 12. Preferably, the cylindrical sidewall of the shaft 18 is generally liquid impermeable such that the interior of the shaft 18 can be filled with, and can generally retain, a quantity of a water 20. A water supply/replenishment conduit 58 can provide fluid communication between the interior of the shaft 18 and a water source/sink 150 to allow water to flow into or out of the interior of the shaft 18 as required when the system 10 is in use. The water source/sink 150 may be of any suitable nature, and may include, for example a connection to a municipal water supply or reservoir, a purposely built reservoir, a storage tank, a water tower, and/or a natural body of water such as a lake, river or ocean, groundwater, or an aquifer. Allowing water to flow through the conduit 58 may help ensure that a sufficient quantity of water 20 may be maintained with shaft 18 and that excess water 20 can be drained from shaft 18. The conduit 58 may be connected to the shaft 18 at any suitable location, and preferably is connected toward the upper end of the shaft 18. Preferably, the conduit 58 can be positioned and configured such that water will flow from the source/sink 150 to the shaft 18 via gravity, and need not include external, powered pumps or other conveying apparatus. Although the conduit 58 is depicted in the figures as horizontal, it may be non-horizontal.

In the arrangement of FIG. 1, the water 20 in the shaft 18 bears against the outside of bulkhead 24 and is thereby supported atop bulkhead 24. The amount of pressure acting on the top surface of the bulkhead 24 in this example will vary with the volume of water 20 that is supported, which will vary with the height of the water column. In this arrangement, the magnitude of the counter force applied to bulkhead 24 is generally proportional to the amount of water 20 held in the shaft 18. To increase the magnitude of the counter force, more water 20 can be added to the interior of the shaft 18. To reduce the magnitude of the counter force, water 20 can be removed from the interior of the shaft 18.

In the embodiment of FIG. 1, a gas conduit 22 (which includes gas conduit sections 22A, 22B) conveys compressed air between the interior of the accumulator 12 and the compressor/expander subsystem 100, or vice versa. Similarly, a liquid conduit 40 conveys water between the interior of the accumulator 12 and the interior of the shaft 18, or vice versa. The conduits 22 and 40 may be formed from any suitable material, including metal, plastic and the like.

In the embodiment of FIG. 1, the gas conduit section 22B can extend within the shaft 18 and pass through the bulkhead 24 to reach the gas layer 14. The liquid conduit 40 can have a lower end that is submerged in the water layer 16 while the system 10 is in use and an upper end that is in communication with the interior of the shaft 18. In this configuration, the liquid conduit 40 can facilitate the exchange of liquid between the water layer 16 and the water 20 in the shaft 18.

The bulkhead 24 can include one or more apertures or other suitable structures to accommodate the gas conduit section 22B, the liquid conduit 40 and other such conduits, such that the conduits pass through the bulkhead 24 to enter the interior of the accumulator 12.

Each of the shaft 18 and the accumulator 12 may be formed in the ground 200 using techniques similar to those used for producing mineshafts and other underground structures.

In embodiments, the pressure at which the water 20 bears against bulkhead 24 and fills the bottom layer 16 of the accumulator 12 can be equal, or nearly equal, to the magnitude of the internal force exerted by the compressed gas layer 14 stored in the accumulator 12. In this arrangement, as more gas is transferred into the gas layer 14 during an accumulation cycle, and its pressure increases, water in the water layer 16 can be displaced and forced upwards through liquid conduit 40 into shaft 18 against the pressure of the water 20 in the shaft 18. More particularly, water can flow from the bottom of accumulator 12 and into shaft 18, and ultimately may be exchanged with the source/sink 150 of water via the replenishment conduit 58. Alternatively, any suitable type of flow limiting or regulating device (such as a pump, valve, orifice plate and the like) can be integrated as part of the water conduit 40. When gas is removed from the gas layer 14, water can be forced from the shaft 18 through the water conduit 40 into the water layer 16. The flow through the replenishment conduit 58 can help ensure that a desired quantity of water 20 may be maintained within shaft 18 as water is forced into and out of the water layer 16, as excess water 20 can be drained from and make-up water can be supplied to the shaft 18. This arrangement can allow the pressures in the accumulator 12 and shaft 18 to at least partially, automatically re-balance as gas is transported into and out of the accumulator 12.

Preferably, the lower end of the liquid conduit 40 is positioned so that it remains submerged in the liquid layer 16 while the system 10 is in use, and is not in direct communication with the gas layer 14. Similarly, to help facilitate extraction of gas from the gas layer, the lower end of the gas conduit 22 (e.g., the lower part of gas conduit section 22B) can be located close to the upper wall of the accumulator 12 or at a high-point in the interior of the accumulator 12. This may help reduce trapping of compressed gas in the accumulator 12.

In embodiments, the system 10 can include a thermal storage subsystem 120 that is operably disposed downstream (relative to the flow of compressed gas in the compression operations) from the compressor 112 and upstream (relative to the flow of compressed gas in the expansion operations) from the multi-stage expander (116A, 116B) as described below and shown in FIG. 2. In this configuration, the thermal storage subsystem 120 is operably disposed between the gas compressor 112 and the accumulator 12, and the thermal storage subsystem 120 is also operably disposed between the accumulator 12 and the plurality of secondary heater stages (e.g., 117A, 117B) and the corresponding plurality of gas expander stages.

During the accumulation operations, the thermal storage subsystem 120 is configured to extract and collect heat from the compressed gas generated by the compressor 112 that flows through the gas conduit sections 22A, 22B for supply to the accumulator 12. During the expansion operations, the thermal storage subsystem 120 is configured to transfer at least a portion of the heat stored by the thermal storage subsystem 120 back into the compressed gas that is being released from the accumulator 12 for supply to the multi-stage expander (116A, 116B) via the gas conduit section 22A.

In embodiments, the thermal storage subsystem 120 can employ a heat storage medium such as pressurized water or other suitable thermal storage fluid/liquid and/or coolant. Optionally, the thermal storage subsystem 120 can employ phase change material(s) for heat storage and release.

In embodiments, the thermal storage subsystem 120 can be located underground as shown in FIG. 1. This configuration can reduce the use of above-ground land and may help facilitate the use of the weight of the earth/rock to help contain the pressure in the heat storage reservoir of the thermal storage subsystem 120. That is, the outward-acting pressure within the storage reservoir can be substantially balanced by the inwardly-acting forces exerted by the earth and rock surrounding the thermal storage subsystem 120.

As shown in FIG. 2, the system 10 includes a compressor/expander subsystem 100 having a compressor 112 (of single or multiple stages) that is driven by a motor 110 powered using electricity from a power grid or by a renewable power source or the like, and optionally controlled using a suitable controller 118. Compressor 112 is driven by motor 110 during accumulation operations, and draws in atmospheric air A and compresses the air. The compressed air 23A is transported down gas conduit section 22A to thermal storage subsystem 120 (for heat extraction) and then down gas conduit section 22B for storage in accumulator 12. The compressor/expander subsystem 100 also includes a multi-stage expander (e.g., two or more gas expander stages with two shown as 116A, 116B) driven by hot compressed air derived from compressed air 23B supplied from the accumulator 12 via the gas conduit section 22B, thermal storage subsystem 120 and gas conduit section 22A during expansion operations. The operation of the multi-stage expander (e.g., gas expander stages 116A, 116B) drives generator 114 to generate electricity. After expansion in the multi-stage expander, the air is conveyed for exit to the atmosphere A. Optionally, the motor 110 and the generator 114 may be provided in a single machine.

As shown in FIG. 2, the system 10 further includes a secondary heater stage 117A disposed upstream of the gas expander stage 116A and configured to heat the compressed air 23B supplied from the accumulator 12 (via the gas conduit section 22B, thermal storage subsystem 120 and gas conduit 22A) for output to the inlet of the gas expander stage 116A during the expansion operations. A secondary heater stage 117B is disposed upstream of the gas expander stage 116B and configured to heat the compressed air supplied from the output from the gas expander stage 116A for output to the inlet of the gas expander stage 116B during the expansion operations. In this manner, the compressed air 23B supplied to the gas expander stages of the multi-stage expander is heated by corresponding secondary heater stages operably disposed upstream of the respective expander stages of the multi-stage expander during the expansion operations. For each gas expander stage of the multi-stage expander, the hot compressed air produced by the corresponding secondary heater stage is supplied to the gas expander stage to drive the operation of the multi-stage expander and the generator 114 during the expansion operations.

In embodiments, the secondary heater stages (e.g., stages 117A, 117B) are supplied with hot thermal fluid 25A from a secondary heat source 119. The hot thermal fluid 25A provides heat that is transferred to the compressed air to heat the compressed air at the secondary heater stage. The cooler thermal fluid 25B that results from such heat transfer can be returned to the secondary heat source 119 as part of closed-loop operations as shown in FIG. 2. In embodiments, the secondary heat source 119 can include a renewable or green energy system, such as a solar PV system or a geothermal system. In other embodiments, the secondary heat source 119 can include an industrial process where waste heat can be collected and/or transferred to the hot thermal fluid 25A supplied to the secondary heater stages (e.g., stages 117A, 117B). For example, the secondary heat source 119 can collect waste heat from a conventional or enhanced geothermal system that extracts thermal energy from a subterranean geothermal reservoir for use in electrical power generation, industrial heating and cooling systems, or other industrial processes and applications. The secondary heat source 119 can be located at or near the site of the compressed gas energy storage system 10.

In embodiments, the secondary heater stages (e.g., stages 117A, 117B) can include a heat exchanger where gas that exits the upstream expander stage is piped through the heat exchanger then back into the downstream expander stage. The heat exchanger can be configured to maximize the transfer of heat to the gas with minimum pressure drop of the gas. In embodiments, the heat exchanger can be configured as a contra flow devise with the hot thermal fluid entering at one end and the gas flowing in the opposite direction with no direct contact between the gas and the thermal fluid. The flow of thermal fluid through the heat exchanger can be controlled to optimize the operations of the heat exchanger.

Controller 118 can be configured to operate the subsystem 100 so as to switch between the accumulation and expansion operations as required, including operating valves for preventing or enabling release of compressed air from the gas conduits as desired. The controller 118 can include a computer processor, which can be embodied by a microprocessor, microcontroller, digital signal processor, general-purpose computer, special-purpose machine, virtual machine, software container, or appliance.

In embodiments, a gas turbine model can be used to characterize the system 10. For example, Rogers, G. F. C. and Mayhew, Y. R., "Engineering Thermodynamics, Work and Mass Transfer", Longman, 1980, ISBN 0-582-30500-4, describes a suitable gas turbine model that involves a gas turbine cycle with the following stages:

1 to 2—Gas compression and work input
2 to 3 Constant pressure heating
3 to 4—Gas expansion and work output From this model, the Work input ($W_{in}$) and the Work out ($W_{out}$) can be defined as:

$$\text{Work input}, W_{in} = C_p(T_2 - T_1), \quad \text{Eqn. [1]}$$

$$\text{Work out}, W_{out} = C_p(T_3 - T_4), \quad \text{Eqn. [2]}$$

where $C_p$ is the thermal heat capacity at constant pressure.

For the energy storage process, the efficiency of the compression and expansion processes may be considered to be $\eta_c$ and $\eta_e$ respectively. Thus, the storage efficiency can be written as:

$$\eta_{system} = \eta_e \eta_c \frac{T_3 - T_4}{T_2 - T_1}, \quad \text{Eqn. [3]}$$

$$\text{for pressure ratio } r_p = \frac{p_2}{p_1}.$$

Assuming isentropic compression and expansion, the temperature ratio $T_2/T_1$ can be written as:

$$\frac{T_2}{T_1} = r_p^{(\gamma-1)/\gamma}, \quad \text{Eqn. [4]}$$

where $\gamma$ is the ratio of specific heats.
The temperature ratio $T_3/T_4$ can be written as:

$$\frac{T_3}{T_4} = (r_p - r_{p\_loss})^{(\gamma-1)/\gamma}, \quad \text{Eqn. [5]}$$

where the relative loss of pressure in the system (mainly frictional) is defined as $r_{p\_loss}$.
The system efficiency can therefore be written as:

$$\eta_{system} = \eta_e \eta_c \frac{T_3}{T_1} \frac{\left(1 - (r_p - r_{p\_loss})^{(1-\gamma)/\gamma}\right)}{\left(r_p^{(\gamma-1)/\gamma} - 1\right)}. \quad \text{Eqn. [6]}$$

For a system without a thermal storage subsystem, the hotter gas at state 2 will cool in the accumulator. If we consider that $T_3=T_1$ we can calculate the system efficiency. For a best-case scenario with no losses in the storage system, perfect compression and expansion, the system efficiency can be written as:

$$\eta_{system\_max} = \frac{\left(1 - r_p^{(1-\gamma)/\gamma}\right)}{\left(r_p^{(\gamma-1)/\gamma-1}\right)}. \qquad \text{Eqn. [7]}$$

Figure 3:
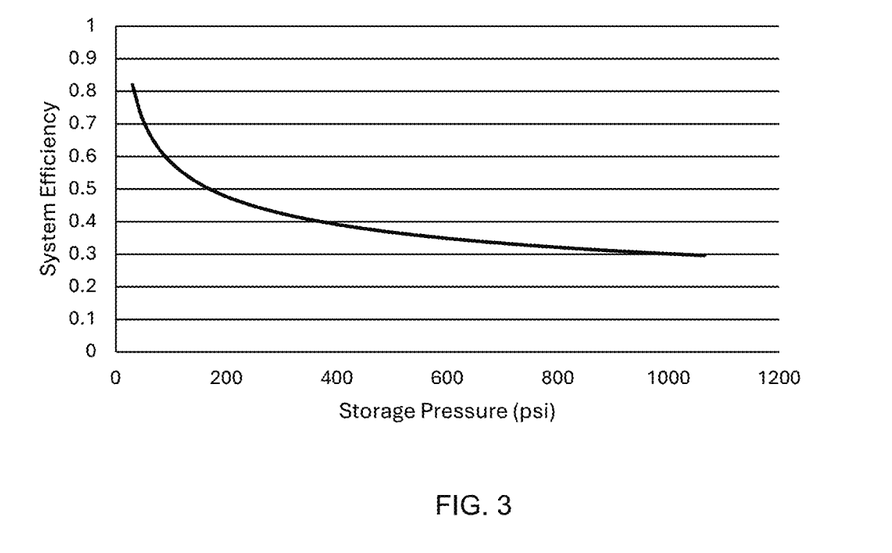
FIG. 3 is a plot of system efficiency as a function of compressed gas storage pressure.

The system efficiency of Eqn. [7] plotted as a function of storage pressure is shown in FIG. 3.

Figure 4:
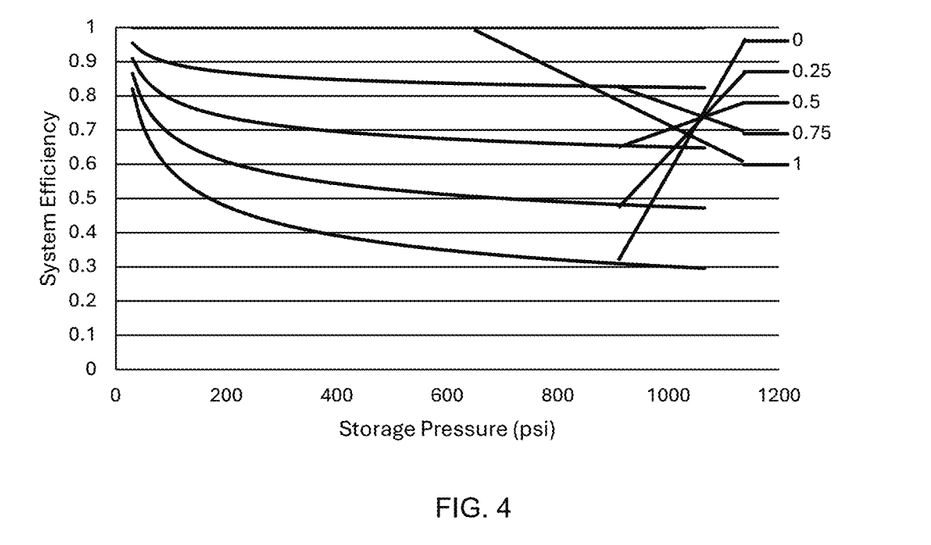
FIG. 4 depicts plots of system efficiency as a function of compressed gas storage pressure for different levels of thermal recovery provided by thermal storage of the system.
Figure 5:
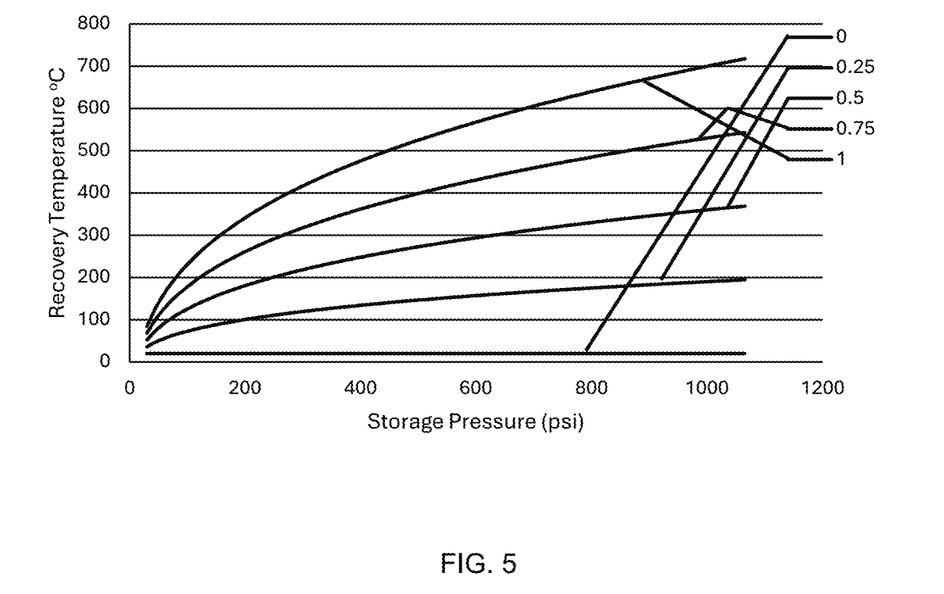
FIG. 5 depicts plots of the gas temperature to be generated by thermal storage of the system as a function of compressed gas storage pressure for the different levels of thermal recovery shown in FIG. 4.

The amount of heat stored by the thermal storage subsystem is comparable with the work put into the system. One can assume that only a fraction of heat available from the gas compression can be collected and made available to heat the compressed gas for expansion. FIG. 4 depicts plots of system efficiency as a function of storage pressure for different levels of thermal recovery. The more significant challenge is the temperature required for this storage. This is shown in FIG. 5, which depicts plots of the gas temperature to be generated in the thermal storage subsystem for the cases shown in FIG. 4. It is evident that for a system that stores compressed gas at 1000 psi and has 25% efficiency thermal storage, the compressed gas must be heated to 200° C. for expansion. Maintaining such temperatures using the thermal storage subsystem alone is a major technical challenge.

Figure 6:
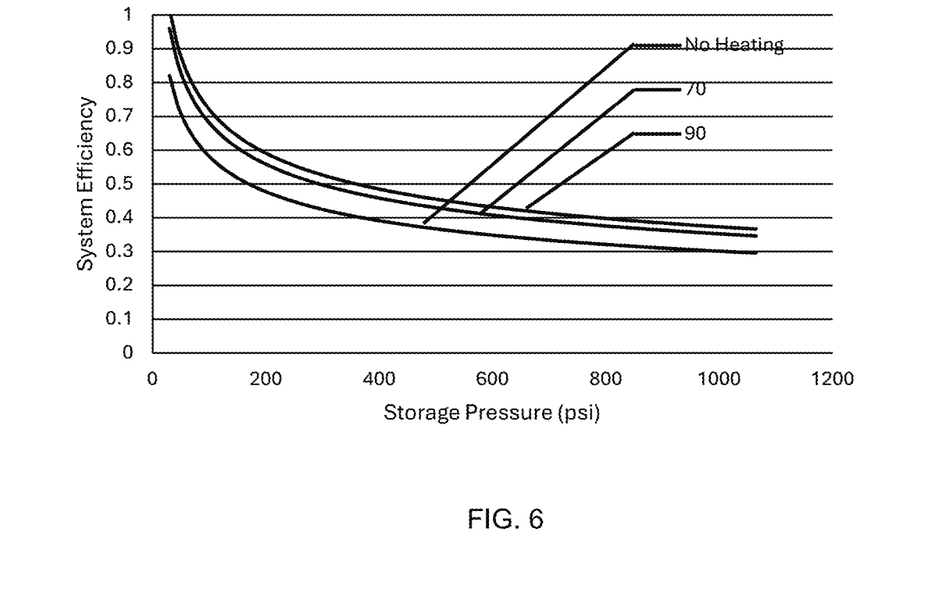
FIG. 6 depicts plots of system efficiencies as a function of compressed gas storage pressure for systems that employ expansion in conjunction with secondary heating at two different temperatures, 70° C. and 90° C.

The thermal storage subsystem may have limited efficiency. To address this limitation, one or more secondary heat sources can be used for the expansion operations. For example, geothermal systems generate temperatures in the range of 60° C. to 90° C. Solar PV systems can produce water at 95° C., which is stored in large reservoirs. If heat from such secondary heat source(s) is used to raise the temperature $T_3$ of the system during the expansion operations, then the system efficiency can be significantly improved. FIG. 6 shows the differences in system efficiencies when $cT_3=70°$ C. and $T_3=90°$ C. Locating the compressed gas storage at or near the secondary heat source can bring a significant benefit.

To reduce the temperature required to heat the gas for expansion, the system employs a multistage expansion system with multiple expander stages where the compressed gas is heated by thermal energy supplied from the secondary heat source upstream of each expander stage. For a system with n expander stages each operating in conjunction with a secondary heater stage at a temperature of $T_3$, the expansion ratio $r_{p\_n}$ of each expander stage can be expressed as:

$$r_p = (r_{p\_n})^n. \qquad \text{Eqn. [8]}$$

So as above, the maximum system efficiency can be written as:

$$\eta_{system\_max\_n} = n \frac{T_3}{T_1} \frac{\left(1 - r_{p\_n}^{(1-\gamma)/\gamma}\right)}{\left(r_p^{(\gamma-1)/\gamma-1}\right)}. \qquad \text{Eqn. [9]}$$

Figure 7:
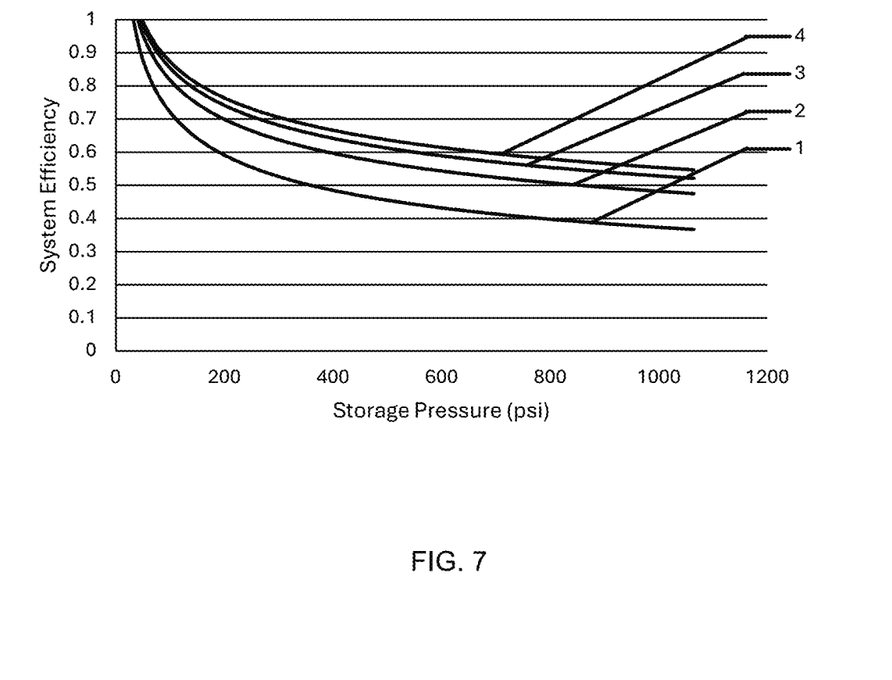
FIG. 7 depicts plots of system efficiency as a function of compressed gas storage pressure for several systems employing multistage expansion with secondary heating at 90° C.

FIG. 7 shows the system efficiencies of several systems employing multistage expansion with modest secondary heating at 90° C. Significantly, it is shown that a multi-stage expansion with modest secondary heating can increase the system efficiency to more than 50%, whereas the single stage expansion system has an efficiency of only 30%.

In conclusion, the process of gas compression can release significant levels of heat. Without thermal storage the efficiency of an ideal system operating at 1000 psi will be 30%. The thermal storage subsystem can increase efficiency but to be effective reheating the gas to temperatures as high as 700° C. is required. Heat from a secondary heat source (for example, heat from a hot fluid at a temperature up to 90° C.) can be used as part of a multistage expander to increase the ideal system efficiency to over 50%.

The gas turbine model as described above can be used to design the system, including the compressor, thermal storage subsystem, accumulator, secondary heaters and multistage expander. For example, equation 6 can be used to design the gas expander stages of the multistage expander. Specifically, for each gas expander stage, the pressure loss (ratio to the inlet pressure) is $r_{p\_loss}$ while the temperature at the inlet to the expander stage is $T_3$ and the temperature at the exit of the expander stage is $T_4$. This temperature $T_4$ is the inlet temperature for the secondary heater stage downstream from the gas expander stage. The pressure at the inlet for the downstream secondary heater stage is $$\frac{p_0}{(r_p + r_{p\,loss})}.$$

Furthermore, the gas turbine model as described above can be used to control operation of the system, including the compressor, the thermal storage subsystem, accumulator, secondary heaters and multistage expander, etc. For example, equation 7 can be used to calculate the mechanical power from each gas expander stage and the results of such calculations can be used to control the pressure drop across the gas expander stages during the expansion operations.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with associated function.

What is claimed is:

1. A system that stores and release compressed gas, the system comprising:
   an accumulator configured to store compressed gas;
   a gas compressor;
   a thermal storage subsystem;
   a plurality of secondary heater stages and a corresponding plurality of gas expander stages; and
   a secondary heat source operably coupled to the plurality of secondary heater stages;
   wherein the thermal storage subsystem is operably disposed between the gas compressor and the accumulator, and wherein the thermal storage subsystem is operably disposed between the accumulator and the plurality of secondary heater stages and the corresponding plurality of gas expander stages;

wherein the gas compressor is configured to produce compressed gas for supply to the accumulator via the thermal storage subsystem during accumulation operations;

wherein the thermal storage subsystem is operably configured to extract heat from the compressed gas produced by the gas compressor and supplied to the accumulator during the accumulation operations and store the heat for use in expansion operations, and wherein the thermal storage subsystem is operably configured to use heat stored by the thermal storage subsystem to heat compressed gas released from the accumulator for supply to the plurality of secondary heater stages and the corresponding plurality of gas expander stages in the expansion operations; and wherein the plurality of secondary heater stages and the corresponding plurality of gas expander stages are configured to heat and expand compressed gas supplied from the accumulator and heated by the thermal storage subsystem, wherein the plurality of secondary heater stages use heat supplied by the secondary heat source to heat the compressed gas supplied from the accumulator and heated by the thermal storage subsystem.

2. A system according to claim 1, wherein:
the secondary heat source extracts heat from a green or renewable system located at or near the system that stores and releases compressed gas.

3. A system according to claim 2, wherein:
the green or renewable system comprises a photovoltaic system or a geothermal system located at or near the system that stores and releases compressed gas.

4. A system according to claim 1, wherein:
the secondary heat source extracts heat from an industrial process located at or near the system that stores and releases compressed gas.

5. A system according to claim 1, wherein:
the secondary heat source supplies hot fluid to the plurality of secondary heater stages at a temperature up to 90° C.

6. A system according to claim 1, wherein:
the gas compressor is driven by a motor during the accumulation operations.

7. A system according to claim 1, wherein:
the plurality of gas expander stages drives an electrical generator during the expansion operations.

8. A system according to claim 1, further comprising:
a controller for controlling the accumulation operations and the expansion operations.

9. A system according to claim 1, wherein:
at least part of the accumulator is disposed underground with a shaft extending from the surface to the accumulator.

10. A system according to claim 1, wherein:
at least part of the thermal storage subsystem is disposed underground.

11. A method that stores and releases compressed gas, the method comprising:
providing a system that stores and releases compressed gas, the system including an accumulator configured to store compressed gas, a gas compressor, a thermal storage subsystem, a plurality of secondary heater stages and a corresponding plurality of gas expander stages, and a secondary heat source operably coupled to the plurality of secondary heater stages;

during accumulation operations, configuring the gas compressor to produce compressed gas for supply to the accumulator via the thermal storage system, wherein the thermal storage subsystem is configured to extract heat from the compressed gas produced by the gas compressor and supplied to the accumulator during the accumulation operations and store the heat for use in expansion operations; and during the expansion operations, configuring the thermal storage subsystem to use heat stored by the thermal storage subsystem to heat compressed gas released from the accumulator for supply to the plurality of secondary heater stages and the corresponding plurality of gas expander stages, wherein the plurality of secondary heater stages and the corresponding plurality of gas expander stages are configured to heat and expand compressed gas supplied from the accumulator and heated by the thermal storage subsystem, wherein the plurality of secondary heater stages use heat supplied by the secondary heat source to heat the compressed gas supplied from the accumulator and heated by the thermal storage subsystem.

12. A method according to claim 11, further comprising:
during the expansion operations, the secondary heat source extracting heat from a green or renewable system located at or near the compressed gas energy storage system.

13. A method according to claim 12, wherein:
the green or renewable system comprises a photovoltaic system or a geothermal system located at or near the compressed gas energy storage system.

14. A method according to claim 11, further comprising:
during the expansion operations, the secondary heat source extracting heat from an industrial process located at or near the compressed gas energy storage system.

15. A method according to claim 11, wherein:
during the expansion operations, the secondary heat source supplies hot fluid to the plurality of secondary heater stages at a temperature up to 90° C.

16. A method according to claim 11, further comprising:
during the accumulation operations, driving the gas compressor with a motor.

17. A method according to claim 11, further comprising:
during the expansion operations, driving an electrical generator with the plurality of gas expander stages.

18. A method according to claim 11, further comprising:
configuring a controller to control the accumulation operations and the expansion operations.

19. A method according to claim 11, wherein:
at least part of the accumulator is disposed underground with a shaft extending from the surface to the accumulator.

20. A method according to claim 11, wherein:
at least part of the thermal storage subsystem is disposed underground.

* * * * *